(12) United States Patent
Maram et al.

(10) Patent No.: US 7,443,593 B2
(45) Date of Patent: Oct. 28, 2008

(54) WAVEFRONT CORRECTION SYSTEM

(75) Inventors: Jonathan Maram, Agoura Hills, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 11/557,442

(22) Filed: Nov. 7, 2006

(65) Prior Publication Data

US 2007/0064297 A1    Mar. 22, 2007

Related U.S. Application Data

(62) Division of application No. 11/101,911, filed on Apr. 8, 2005, now Pat. No. 7,154,658.

(51) Int. Cl.
   *G02B 27/14* (2006.01)
(52) U.S. Cl. .................. 359/637; 359/629

(58) Field of Classification Search .................. 359/618, 359/629, 637, 639
See application file for complete search history.

(56) References Cited

U.S. PATENT DOCUMENTS 4,711,576 A * 12/1987 Ban .......................... 356/499

* cited by examiner

*Primary Examiner*—William C Choi
(74) *Attorney, Agent, or Firm*—MacPherson Kwok Chen & Heid LLP

(57) ABSTRACT

A wavefront correction system using a dual frequency liquid crystal spatial light modulator to vary phase relationships of a wavefront is disclosed. A light beam from the dual frequency liquid crystal spatial light modulator can be split into a reference beam and a plurality of measurement beams to enhance a speed and/or accuracy of phase measurement. A temperature of the dual frequency liquid crystal spatial light modulator can be sensed to facilitate temperature control and/or temperature compensation, so as to enhance the accuracy associated with use of the crossover frequency used to control the dual frequency liquid crystal spatial light modulator.

4 Claims, 3 Drawing Sheets

WAVEFRONT CORRECTION SYSTEM

CROSS REFERENCE TO RELATED APPLICATIONS

This application is a divisional of and claims priority to U.S. application Ser. No. 11/101,911, filed on Apr. 8, 2005, now U.S. Pat. No. 7,154,658 entitled "Wavefront Correction System," the disclosure of which is hereby incorporated by reference in its entirety.

TECHNICAL FIELD

The present invention relates generally to optics and, more particularly, to a method and system for phase correcting wavefronts of light beams.

BACKGROUND

It is often desirable to compensate for the detrimental effects of the atmosphere upon light transmitted therethrough. Phase misalignments of a light beam transmitted through the atmosphere occur because of spatial and temporal variations in the density and chemical composition of the atmosphere. These distortions can be considered to occur in a series of wavefronts along the beam's propagation direction.

More particularly, variations in the density and chemical composition of the atmosphere cause corresponding variations in the index of refraction of the atmosphere. These variations in the index of refraction cause undesirable distortion of the phase of a light beam's wavefronts. That is, the index of refraction variations lead to local speed of light variations, causing differences in the optical path length experienced by different portions of a wavefront.

Such distortion has detrimental effects upon light beams used in various applications, including optical communications, imaging, and weaponry. In optical communications, atmospheric distortion can substantially limit bandwidth. In imaging, atmospheric distortion can undesirably reduce the resolution of telescopes and cameras. In directed energy weaponry, atmospheric distortion can limit the amount of power delivered within a given area upon a target.

Wavefront correction can be used to compensate for atmospheric distortion. Contemporary systems for wavefront correction, particularly in high power applications, commonly use mechanical devices such as deformable mirrors. Such mechanical devices are useful because the large surface areas within their active correction regions readily accommodate high laser powers. However, such mechanical devices tend to be undesirably bulky and heavy. Thus, their use has a significantly detrimental impact upon launch and flight costs for space-based systems.

The use of spatial light modulators for wavefront correction is known. For example, a phase-only dual-frequency liquid crystal spatial light modulator can vary the phase relationships of portions of a wavefront on a pixel-by-pixel basis. In this manner, phase misalignments caused by differences in the index of refraction for the optical paths traveled by different portions of a light beam can be mitigated.

The amount of wavefront correction needed for each portion of a light beam tends to vary generally continuously. Thus, each pixel of the spatial light modulator needs to react generally continuously and in real time, so as to provide the desired correction.

The light beam should be monitored with sufficient accuracy as to facilitate such real-time control of the spatial light modulator. That is, the relative phase relationships of the different portions of the light beam need to be measured and control signals then provided to the spatial light modulator so as to facilitate accurate varying of the phase delays introduced thereby on a pixel-by-pixel basis. However, variations in the temperature of a spatial light modulator can vary it response, thus inhibiting its ability to respond accurately to control signals. For example, variations in the temperature of a dual-frequency liquid crystal spatial light modulator can undesirably cause corresponding variations in the crossover frequency thereof.

As a result, there is a need for a method and system for accurately determining the amount of wavefront phase correction needed and then quickly and precisely providing wavefront phase correction, particularly wherein the detrimental effects of temperature variations of the phase correction device are mitigated.

SUMMARY

Systems and methods are disclosed herein for performing wavefront correction by using a dual frequency liquid crystal spatial light modulator to vary phase relationships of a wavefront. According to one embodiment of the present invention, a desired wavefront (having desire phase relationships) can be selected from a plurality of wavefronts stored in a memory. The actual wavefront can then be modified so as to conform generally to the phase relationships of the selected wavefront.

According to one embodiment of the present invention, a light beam from the dual frequency liquid crystal spatial light modulator is split into a reference beam and a plurality of measurement beams. The reference beam interferes with each of the measurement beams. This interference can be measured with dedicated sensors for each measurement beam. Such splitting of the light beam enhances the speed and/or accuracy of phase measurement.

According to one embodiment of the present invention, a temperature of the dual frequency liquid crystal spatial light modulator is sensed to facilitate temperature control and/or temperature compensation. In this manner, the accuracy associated with use of the crossover frequency to control the dual frequency liquid crystal spatial light modulator is substantially enhanced.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to at least one aspect of the present invention, real time wavefront correction is facilitated. That is, undesirable deviations from a desired wavefront phase relationship are sensed and correcting very rapidly, so as to mitigate phase deviations that can be substantially detrimental in many applications. According to at least one aspect of the present invention, a phase measurement system responds quickly and accurately to changes in a wavefront's phase relationships and a phase correcting device similarly responds quickly and accurately to control signals from a control system that is responsive to the phase measurement system. According to at least one aspect of the present invention, temperature variations that can change the response of the phase correcting device, thus inhibiting its ability to respond quickly and accurately, are controlled and/or compensated for.

Figure 1:
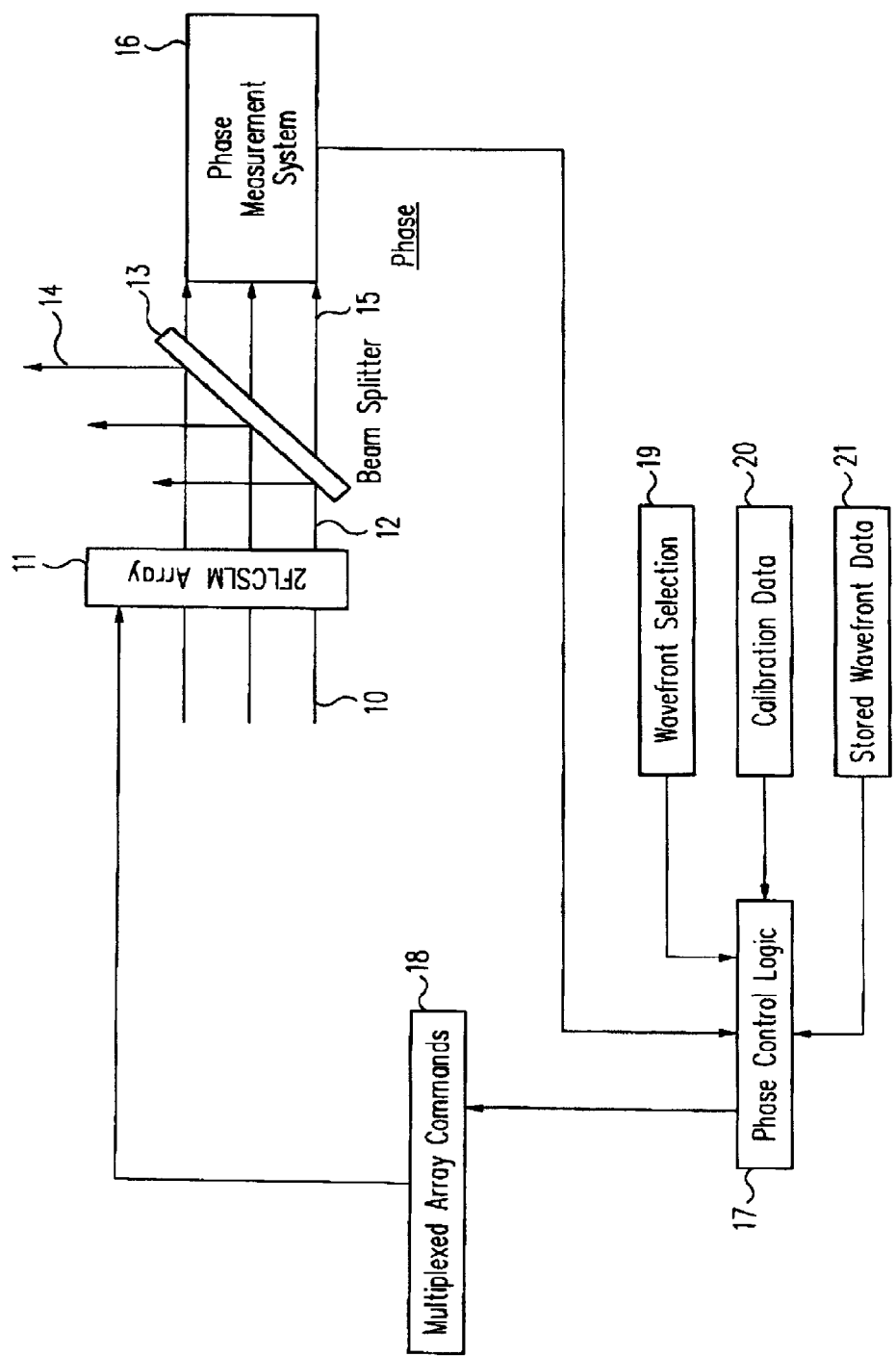
FIG. 1 shows a block diagram illustrating a wavefront correction system using a programmable dual frequency liquid crystal spatial light modulator in accordance with an exemplary embodiment of the present invention.

FIG. 1 shows a wavefront correction system using a programmable dual frequency liquid crystal spatial light modulator in accordance with an exemplary embodiment of the present invention. More particularly, uncorrected light 10 passes through a two dimensional dual frequency liquid crystal spatial light modulator 11 to form phase corrected light 12 that is incident upon a beam splitter 13.

Uncorrected light 10 can be laser light. Uncorrected light 10 is that light for which wavefront correction is desired so as to enhance the light's usefulness in such applications as communications, imagery, and weaponry. That is, phase corrected light 12 can better (with respect to uncorrected light 10) be used for such applications.

The wavefront correction system of the present invention delays the phase of portions of uncorrected light 10, so as to provide a desired phase relationship at wavefronts thereof. This delay is provided by dual frequency liquid crystal spatial light modulator 11. Dual frequency liquid crystal spatial light modulator 11 modifies the phase of portions of uncorrected light 10 on a pixel level. Selected portions of a wavefront of uncorrected light 10 can be varied in phase such that the phase across the wavefront is approximately equal (or otherwise has a desired relationship) at all locations within the wavefront of corrected light 12.

A portion of phase corrected light 12 from dual frequency liquid crystal spatial light modulator 11 passes through beam splitter 13 to form light sample 15. Light sample 15 is used to determine the phase at various portions of a wavefront as discussed in detail below. Another portion of phase corrected light 12 from dual frequency liquid crystal spatial light modulator 11 is reflected from beam splitter 13 to form application light 14. Application light 14 is used in the desired application, such as communications, imagery, or weaponry. Typically, much more of phase corrected light 12 is reflected by splitter 13 to become application light 14 than is transmitted by splitter 13 to become light sample 15. Since application light 14 has been subjected to wavefront correction by dual frequency liquid crystal spatial light modulator 11, it will generally be more effective for its intended purpose.

Light sample 15 from beam splitter 13 is incident upon a phase measurement system 16. Phase measurement system 16 determines the phase relationships of a wavefront of incident light 10 and provides a phase image output to phase control logic 17.

Phase measurement system 16 can comprise a Hartmann sensor. Phase measurement system 16 can comprise any electronic, optical, electro-optical, or other device suitable for measuring the phase of portions of light sample 15 on a pixel level. The resolution of phase measurement system 16 can correspond to the resolution of dual frequency liquid crystal spatial light modulator 11. That is, phase measurement system 16 can be capable of measuring the phase for corrected light 12 from each pixel of dual frequency liquid crystal spatial light modulator 11.

Phase control logic 17 also receives inputs from wavefront selection circuit 19, calibration data storage 20 and stored wavefront data storage 21. Phase control logic 17 provides an output to a multiplexed array commands circuit 18 that provides the dual frequency control signals to dual frequency liquid crystal spatial light modulator 11. That is, phase control logic 17 determines how the phase relationships of a wavefront must be modified in order to provide the desire phase relationship and provides a signal to multiplexed array commands circuit 18, which converts this signal into the actual drive commands that control the operation of dual frequency liquid crystal spatial light modulator 11, as discussed below.

According to one aspect of the present invention, electronically stored records of array commands that are calibrated to induce diffraction patterns that yield desired light beam profiles, are used to control the dual frequency liquid crystal spatial light modulator 11. Thus, data stored in a control system, such as data stored in stored wavefront data storage 21, can be used to define the shape or phase relationships of the desired waveform.

More particularly, this data can be combined with the measured phase data to determine commands to dual frequency liquid crystal spatial light modulator 11, so that dual frequency liquid crystal spatial light modulator 11 can effect phase correction in order to provide the desired wavefront phase relationships. As mentioned above, data corresponding to a plurality of different wavefront phase profiles can be stored in stored wavefront data storage 21 in order to facilitate the formation of desired wavefront phase profiles.

Indeed, the wavefront correction system of the present invention need not be limited to the correction of phase distortion cause by the atmosphere or other factors. Rather, at least one embodiment of the wavefront correction system can simply be used to form a desired wavefront phase profile. Thus, at least one embodiment of the present invention can be used to vary the wavefront phase profile in instances where atmospheric distortion is a consideration and at least one embodiment of the present invention can be used to vary the wavefront phase profile in instances where atmospheric distortion is not a consideration.

Calibration data from calibration data storage 20 can be used to compensate for device, alignment, materials, and temperature inconsistencies. That is, calibration data can contain correction factors that can be applied to the phase image from phase measurement system 16, so as to compensate for variations in parameters that would otherwise tend to degrade the operation of the wavefront correction system.

Wavefront selection circuit 19 facilitates the selection of a desired wavefront phase configuration. Thus, wavefront selection circuit 19 can facilitate the selection of a desired wavefront configuration from stored wavefront data storage 21. Phase control logic 17 can receive a selected wavefront phase configuration from stored wavefront data storage 21, as specified by wavefront selection 19, and can use it, along with calibration data from calibration data storage 20 and the phase image from phase measurement system 16, to provide control signal via multiplexed array commands circuit 18 to dual frequency liquid crystal spatial light modulator 11, so as to provide application light 14 having the desired wavefront phase configuration.

Figure 2:
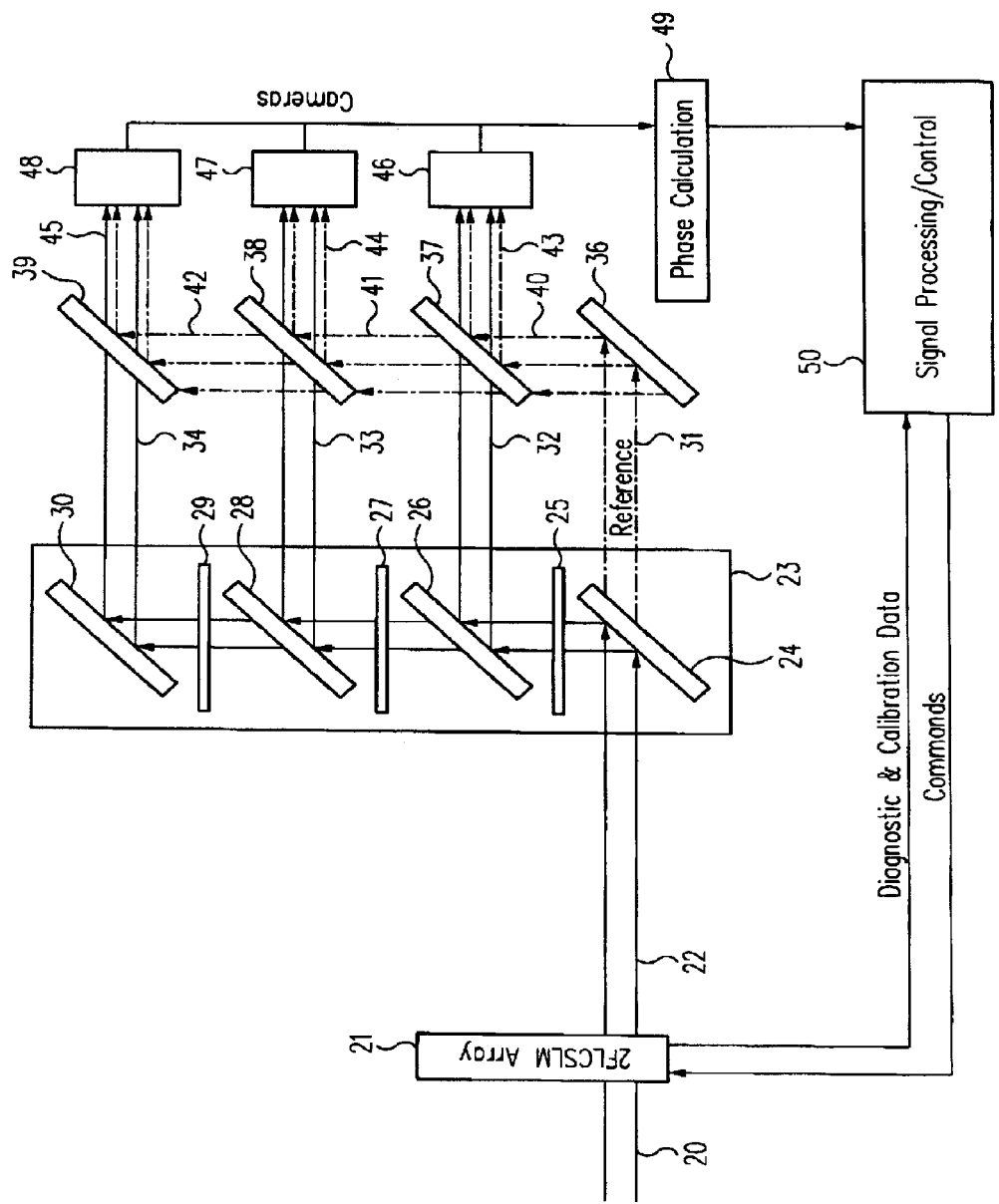
FIG. 2 shows a block diagram illustrating a wavefront correction system using a programmable dual frequency liquid crystal spatial light modulator wherein light is split into three components and each component is phase-delayed by a known amount to measure wavefront phase in accordance with an exemplary embodiment of the present invention.

FIG. 2 shows a block diagram illustrating a wavefront correction system using a programmable dual frequency liquid crystal spatial light modulator 21 wherein light is split into three components and each component is phase-delayed by a known amount so as to better measure wavefront phase in accordance with an exemplary embodiment of the present invention. This configuration facilitates the measurement of phase at high speed, so as to facilitate real time control of a duel frequency liquid crystal spatial light modulator for use in wavefront correction.

More particularly, uncorrected light 20 passes through dual frequency liquid crystal spatial light modulator 21 to form phase corrected light 22 which may better be used for variety of different applications, as discussed above. Thus, a portion of phase corrected light is generally split away to form application light, as shown in FIG. 1 and discussed above. Phase corrected light 22 is communicated to a splitter assembly 23 that separates corrected light 22 into a reference beam 31 and a plurality of measurement beams 32, 33, and 34.

As shown in FIG. 2, corrected light 22 can be split into three measurement beams. Alternatively, corrected light 22 can be split into two measurement beams or into more than three measurement beams. Generally, splitting corrected light 22 into more measurement beams facilitates quicker and more accurate phase measurement and thus better phase correction via dual frequency liquid crystal spatial light modulator 21.

Beam splitter assembly 23 can comprise splitter 24 that directs light to splitters 26 and 28, as well as to reflector 30 and that also directs reference light 31 out of splitter assembly 23. In front of one or more of splitters 26 and 28 and reflector 30 can be placed phase delay devices 25, 27, 29 respectively. Such phase delay devices 25, 27, and 29 help define the optical path lengths of light transmitted therethrough. Alternatively, physical (dependent upon distance rather than a combination of distance and material) path lengths can be configured so as to provide the desire phase delays.

Splitters 26 and 28 and reflector 30 communicate measurement light 32, 33, and 34 to combiners (splitters) 37, 38, and 39. Similarly, splitter 24 transmits reference light 31, which is reflected by reflector 36 to provide reflected reference light 40.

Combiners 37, 38, and 39 combine light 32, 33, and 34 with reflected reference light 40 and communicate combined light 43, 44, and 45 to sensors 46, 47, and 48. Sensors 46, 47, and 48 can be imagers, such as charge coupled device (CCD) sensors, wherein each pixel thereof is aligned with respect to a dedicated pixel of dual frequency liquid crystal spatial light modulator 21.

One way in which the present invention can speed up the phase measurement process is via the use of a plurality of lower resolution sensors. As those skilled in the art will appreciate, a plurality of lower resolution sensors can be read, in parallel, faster that a single higher resolution sensor. Thus, according to one aspect of the present invention, each of the sensors can optionally correspond to different dedicated pixels of dual frequency liquid crystal spatial light modulator 21. In this manner, the phase measurement process can be performed by reading the phase of three sets of pixels in parallel.

The outputs of sensors 46, 47, and 48 are provided to phase calculation circuit 49. Phase calculation circuit 49 determines the phase on a pixel level and provides an output to signal processing/control 50.

Signal processing control 50 uses the phase information from phase calculation circuit 49 to generate commands that cause dual frequency liquid crystal spatial light modulator 21 to provide desired phase correction. Optionally, calibration data is communicated from dual frequency liquid crystal spatial light modulator 21 to signal processing/control 50 so as to better facilitate control of dual frequency liquid crystal spatial light modulator 21. Diagnostic information can also be communicated from dual frequency liquid crystal spatial light modulator 21 to signal processing/control circuit 50 to further enhance operation of the wavefront correction system.

Thus, according to one aspect of the present invention, light passing through dual frequency liquid crystal spatial light modulator 21 is split into three or more components. Each component is delayed by a multiple of a known phase shift. Each phase-delayed component is combined with reference light and the intensities of the interfering beams are measured with sensors, digital cameras or similar means. Data from the sensors is processed and mathematically combined according to well-known principles to derive the phase of the light transmitted through dual frequency liquid crystal spatial light modulator 21. Diagnostic and calibration data from dual frequency liquid crystal spatial light modulator 21 (which can comprise voltages, temperature information) and measured phase information are used in combination to determine required commands to dual frequency liquid crystal spatial light modulator 21, so as to effect the desired phase at each of its elements, e.g., pixels. These commands are communicated to dual frequency liquid crystal spatial light modulator 21.

Thus, according to at least one aspect of the present invention, high speed, e.g. real time, phase measurement and wavefront correction is obtained. The use of plural sensors facilitates such phase measurement speed enhancement by splitting the readout/processing time amount a plurality of sensors.

Accuracy of phase measurement can optionally be enhanced by configuring the path lengths such that the effects of interference are enhanced. That is, the multiple path length of the different measurement beam/reference beam combination can be configured such that one of the paths generally interferes more effectively (and is thus more accurately quantified) with respect to the other paths. Since the paths are phase shifted with respect to one another, one sensor will generally be best suited to make a phase measurement for a given pixel and that sensor can be selected for the phase measurement.

Those skilled in the art will appreciate that the components shown in FIG. 2 may be arranged in various other configurations and that other components such as phase rotators and polarization filters may be used according to well known principles to minimize presence undesirable light components at various location of the wavefront correction system. For example, phase rotators such as quarter or half wave plates and polarization filters can be used inhibit the combination of light beams 32, 33, and 34 with one another via combiners 37, 38, and 39, while readily permitting the combination of light beams 32, 33, and 34 with reference beam 31, so as to enhance the performance of the wavefront correction system.

Figure 3:
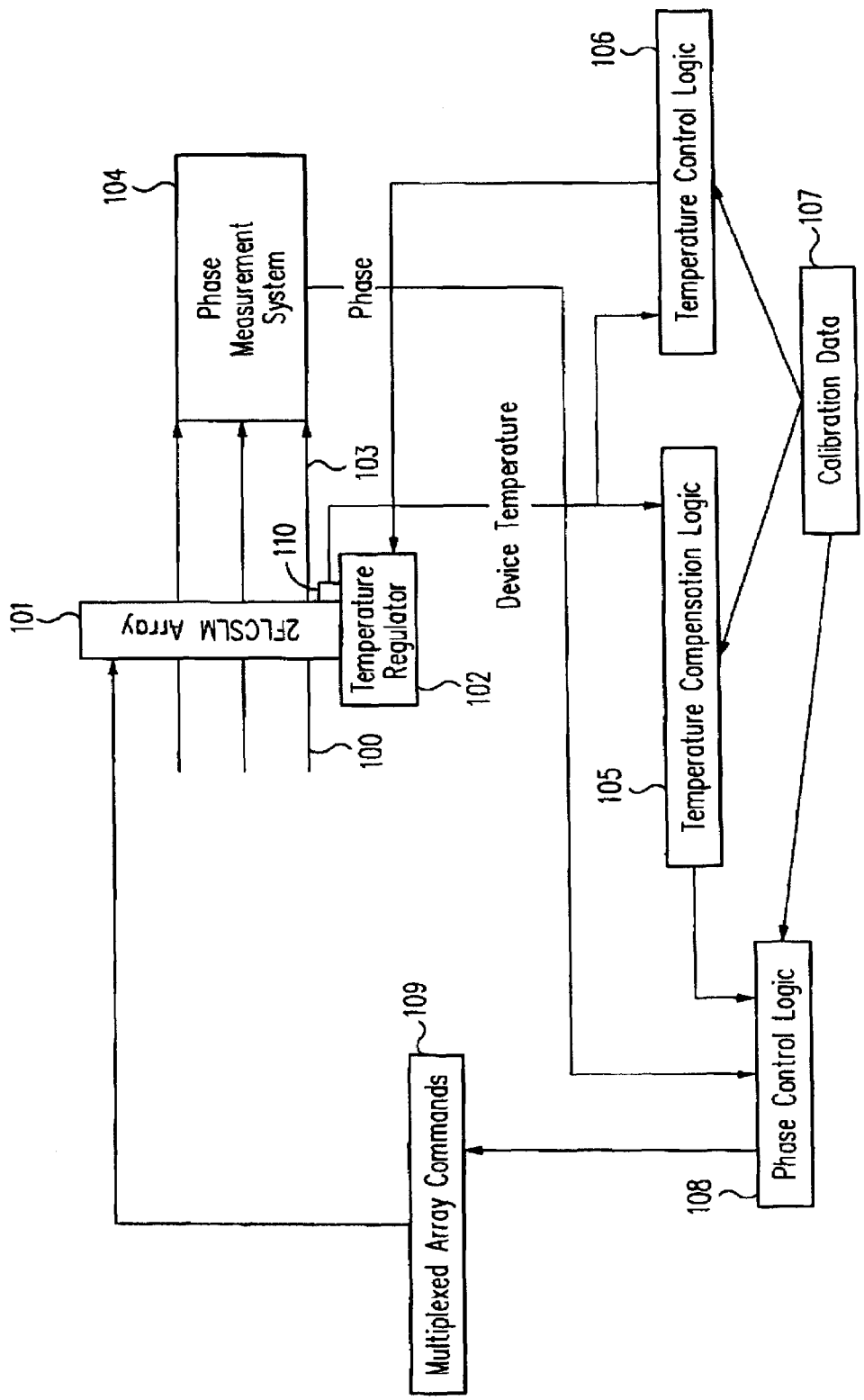
FIG. 3 shows a block diagram illustrating a temperature compensation system for a programmable dual frequency liquid crystal spatial light modulator in accordance with an exemplary embodiment of the present invention.

FIG. 3 shows a temperature control/compensation system that provides enhanced control of a wavefront phase correction device, such as a dual frequency liquid crystal spatial light modulator. As those skilled in the art will appreciate, dual frequency liquid crystal spatial light modulators are sensitive to temperature.

The liquid crystal orientation of a dual frequency liquid crystal spatial light modulator shifts from normal to parallel at a drive voltage crossover frequency. Below the crossover frequency, the orientation of the liquid crystal is normal. Above the crossover frequency, the orientation of the liquid crystal is parallel. The crystal orientation determines the amount of phase shift provided by the dual frequency liquid crystal spatial light modulator. Thus, it is important to precisely know the crossover frequency.

However, the crossover frequency of a dual frequency liquid crystal spatial light modulator is highly dependent upon the temperature of the dual frequency liquid crystal spatial light modulator. Thus, in order to maintain accurate phase control of a light beam's wavefront, some means for controlling and/or compensating for temperature variations (and the consequent crossover frequency variations) of the dual frequency liquid crystal spatial light modulator can be implemented. At least one aspect of the present invention facilitates enhanced operation of a dual frequency liquid crystal spatial light modulator wavefront correction system by controlling and/or compensating for temperature variations of a dual frequency liquid crystal spatial light modulator.

More particularly, as shown in FIG. 3, uncorrected light 100 passes through a dual frequency liquid crystal spatial light modulator 101 to form phase corrected light 103. At least a portion of phase corrected light from dual frequency liquid crystal spatial light modulator 101 is incident upon phase measurement system 104. Typically, a portion of phase corrected light 103 is split away for use in a desired application, as discussed above. Phase measurement system 104 provides a phase image output that is representative of the phase relationships of phase corrected light 103 on a pixel level.

The phase image output from phase measurement system 104 is provided to phase control logic 108. Phase control logic 108 provides a control signal to multiplexed array commands circuit 109 that uses this signal to provide multiplexed array commands to dual frequency liquid crystal spatial light modulator 101, so as to provided the desired wavefront phase relationships.

A temperature regulator 102 tends to maintain the temperature of dual frequency liquid crystal spatial light modulator 101 at a generally constant level, so as to mitigate undesirable variations in the crossover frequency. Temperature regulator 102 can be disposed proximate dual frequency liquid crystal spatial light modulator 101 and can be attached thereto. Temperature regulator 102 is in sufficient thermal contact with dual frequency liquid crystal spatial light modulator 101 so as to facilitate temperature control thereof.

Temperature regulator 102 can comprises a heat sink that tends to mitigate undesirable temperature variation of dual frequency liquid crystal spatial light modulator 101. Thus, temperature regulator 102 can comprise a passive temperature regulation device. Temperature regulator 102 can comprise a heater and/or cooler. For example, temperature regulator 102 can comprise a Peltier thermoelectric device that can be used to maintain the temperature of dual frequency liquid crystal spatial light modulator 101 within a desire range so as to similarly maintain the crossover frequency with a desired range. Thus, temperature regulator 102 can comprise an active temperature regulation device. Indeed, temperature regulator 102 can comprises any desired combination of passive and active devices.

Temperature regulator 102 can comprise a temperature sensor for monitoring a temperature of dual frequency liquid crystal spatial light modulator 101. Alternatively, temperature sensor can use an external (with respect to temperature regulator 102) temperature sensor, such as temperature sensor 110, to facilitate temperature regulation of dual frequency liquid crystal spatial light modulator 101.

Temperature sensor 110 senses a temperature of dual frequency liquid crystal spatial light modulator 101 and provides a temperature signal to temperature compensation logic 105 and to temperature control logic 106. Calibration data circuit 107 provides calibration data to temperature compensation logic 105, as well as to phase control logic 108 and temperature control logic 106. The calibration data tends to compensate for differences in manufacturing tolerances, materials, and such, as discussed above.

Temperature control logic 106 can use the temperature provided by temperature sensor 110 to facilitate control of temperature regulator 102. Alternatively, an internal (with respect to temperature regulator 102) temperature sensor can facilitate such control.

Temperature compensation logic 105 uses temperature sensor 110 to generate a signal to phase control logic 108 that tends to compensate for temperature variations of dual frequency liquid crystal spatial light modulator 101 in a manner that mitigates undesirable variations of the crossover frequency. That is, as the crossover frequency of dual frequency liquid crystal spatial light modulator 101 changes due to temperature changes thereof, temperature compensation logic 105 compensates for such changes in the crossover frequency by facilitating re-definition of the crossover frequency in light of the temperature changes of dual frequency liquid crystal spatial light modulator 101.

According to at least one aspect of the present invention, the temperature of dual frequency liquid crystal spatial light modulator 101 is measured and monitored by an electronic data processing system. Algorithms in the system are used to determine the crossover frequency and other device characteristics at the measured temperature, so as to determine the effects of temperature upon phase. Algorithms are also used to determine the extent to which the temperature effect can be mitigated by means of compensation, and requirements for active temperature control.

As temperature changes modify the actual crossover frequency of the dual frequency liquid crystal spatial light modulator 101, the expected crossover frequency assumed by the control circuitry can similarly be modified so that effective control is maintained. Optionally, temperature changes of the dual frequency liquid crystal spatial light modulator 101 itself can be monitored and mitigate via active temperature regulation. Thus, the expected crossover frequency of the control signal is modified and/or the temperature of the dual frequency liquid crystal spatial light modulator 101 is controlled, so as to provide enhanced operation of the wavefront correction system.

The wavefront correction system of the present invention has a variety of different applications in such fields as communication, imagery, and weaponry. For example, the wavefront correction system may be used to enhance the phase relationship of a wavefront of a light beam so as to better facilitate use of the light beam in such applications.

Further, embodiments of the wavefront correction system of the present invention may find use in a variety of different applications. For example, the wavefront correction system may be used to effect a lensing element, the focal point of which can be varied dynamically, without the use of any mechanical elements.

According to one or more aspects of the present invention, wavefront correction is performed substantially in real time. That is, deviation from a desired wavefront phase relationship can be sensed and corrected very rapidly. Thus, the phase measurement system can respond quickly and accurately to changes in the wavefront's phase relationships and the phase correcting device can respond quickly and accurately to control signals from a control system that is responsive to the phase measurement system. Temperature variations can be compensated for, thus enhancing the ability of the wave correction system to respond quickly and accurately.

Thus, at least one embodiment of the present invention comprises a method and system for quickly and accurately providing wavefront phase correction wherein the detrimental effects of temperature variation of the phase correction device are compensated for.

Reference to pixel level operation can include either operation on an individual pixel level or operation on groups of pixels. Groups of pixels can be used rather than individual pixel to enhance sensitivity, when system limitations make such use appropriate, or for any other reason. The use of dedicated pixels of sensors with respect to the pixels of a dual frequency liquid crystal spatial light modulator include the use of dedicated groups of pixels of the sensors corresponding to dedicated ones or groups of sensors of the dual frequency liquid crystal spatial light modulator and vice-versa.

Embodiments described above illustrate but do not limit the invention. It should also be understood that numerous modifications and variations are possible in accordance with the principles of the present invention. Accordingly, the scope of the invention is defined only by the following claims.

We claim:

1. A method for wavefront correction, the method comprising splitting light into a plurality of components and combining at least some of the components to facilitate measurement of interference of the combined components;

and correcting the wavefront responsive to the measurement of interference.

2. The method as recited in claim 1, wherein splitting light into a plurality of components comprises splitting light into a reference beam and a plurality of measurement beams, each measurement beam being combined with the reference beam to facilitate measurement of interference of the combined components.

3. The method as recited in claim 1, wherein splitting light into a plurality of components comprises splitting light into a reference beam and three measurement beams, each measurement beam being combined with the reference beam to facilitate measurement of interference of the combined components.

4. The method as recited in claim 1, wherein the light was phase corrected via a dual frequency liquid crystal spatial light modulator prior to splitting and measurement of interference of the combined components facilitates control of the liquid crystal spatial light modulator.

* * * * *